US010332236B2

(12) United States Patent
Long et al.

(10) Patent No.: US 10,332,236 B2
(45) Date of Patent: Jun. 25, 2019

(54) METHOD AND APPARATUS FOR ADSORBING STRAIGHT LINE/LINE SEGMENT, METHOD AND APPARATUS FOR CONSTRUCTING POLYGON

(71) Applicant: INTSIG Information Co., Ltd., Shanghai (CN)

(72) Inventors: Teng Long, Shanghai (CN); Yue Wang, Shanghai (CN); Lixin Zhen, Shanghai (CN)

(73) Assignee: INTSIG INFORMATION CO., LTD., Shanghai (CN)

( * ) Notice: Subject to any disclaimer, the term of this patent is extended or adjusted under 35 U.S.C. 154(b) by 0 days.

(21) Appl. No.: 14/912,369

(22) PCT Filed: Aug. 7, 2014

(86) PCT No.: PCT/CN2014/083862
§ 371 (c)(1),
(2) Date: Feb. 16, 2016

(87) PCT Pub. No.: WO2015/021877
PCT Pub. Date: Feb. 19, 2015

(65) Prior Publication Data
US 2016/0203381 A1 Jul. 14, 2016

(30) Foreign Application Priority Data

Aug. 16, 2013 (CN) .......................... 2013 1 0357997

(51) Int. Cl.
G06K 9/34 (2006.01)
G06T 3/00 (2006.01)
(Continued)

(52) U.S. Cl.
CPC .................. *G06T 3/00* (2013.01); *G06T 7/20* (2013.01); *G06T 7/60* (2013.01); *G06T 11/60* (2013.01); *G06K 9/3275* (2013.01)

(58) Field of Classification Search
CPC ......... G06K 9/3275; G06T 11/60; G06T 3/00; G06T 7/20; G06T 7/60
See application file for complete search history.

(56) References Cited

U.S. PATENT DOCUMENTS 5,798,752 A * 8/1998 Buxton .................. G06F 3/038
345/157
5,808,623 A 9/1998 Hamburg
(Continued)

FOREIGN PATENT DOCUMENTS

| CN | 1675649 A | 9/2005 |
|----|-----------|--------|
| CN | 101408988 A | 4/2009 |

(Continued)

OTHER PUBLICATIONS

1. Eric Allan Bier et al. "Snap-Dragging", 1986, ACM, vol. 20, No. 4, pp. 233-240.*
(Continued)

Primary Examiner — Samir A Ahmed
(74) Attorney, Agent, or Firm — Arch & Lake LLP

(57) ABSTRACT

The present invention discloses a method for adsorbing a straight line/line segment in an image, including: presetting a straight line/line segment, dragging the straight line/line segment by selecting a first part of the line segment, and when a second part of the straight line/line segment is dragged to the vicinity of a line segment in an image, setting the preset line segment to be superposed with the line segment, the vicinity referring to that a minimum distance between the second part of the straight line/line segment and the line segment meets a preset rule. In the present invention, by means of the foregoing technical solution, a user can be (Continued)

conveniently assisted, according to a line segment that exists in an image, to define a polygon frame, so that subsequent image processing can be conveniently performed.

13 Claims, 8 Drawing Sheets

(51) Int. Cl.
*G06T 7/20* (2017.01)
*G06T 7/60* (2017.01)
*G06T 11/60* (2006.01)
*G06K 9/32* (2006.01)

(56) References Cited

U.S. PATENT DOCUMENTS

| | | | |
|---|---|---|---|
| 7,995,073 B1 | 8/2011 | Shemanarev | |
| 8,086,023 B2 * | 12/2011 | Shimodaira | G06K 9/6204 382/149 |
| 2003/0074156 A1 | 4/2003 | Ikeda | |
| 2004/0125350 A1 * | 7/2004 | Kwarta | G03B 27/53 355/41 |
| 2004/0171069 A1 * | 9/2004 | Cook | C07J 33/00 435/7.1 |
| 2006/0146050 A1 | 7/2006 | Yamauchi | |
| 2008/0256440 A1 * | 10/2008 | Boreham | G06F 17/211 715/247 |
| 2009/0202135 A1 * | 8/2009 | Shimodaira | G06K 9/6204 382/141 |
| 2013/0223707 A1 * | 8/2013 | Stephenson | A63B 24/0003 382/128 |
| 2014/0099624 A1 * | 4/2014 | Dohring | G09B 7/00 434/350 |

FOREIGN PATENT DOCUMENTS

| | | | |
|---|---|---|---|
| CN | 101807293 A | 8/2010 | |
| CN | 102103578 A | 6/2011 | |
| CN | 102736836 A | 10/2012 | |
| CN | 102938064 A | 2/2013 | |
| CN | 103208119 A | 7/2013 | |
| CN | 103400387 A | 11/2013 | |
| JP | 2002215683 A | 8/2002 | |
| JP | 2005149241 A | 6/2005 | |
| JP | 2007198934 A | 8/2007 | |
| JP | 2009141412 A | 6/2009 | |
| JP | 2009182436 A | 8/2009 | |

OTHER PUBLICATIONS

Chinese First Search Report issued in corresponding CN Patent Application No. 201310357997.1, dated Sep. 29, 2015, 2 pages.
Chinese First Office Action (including English translation) issued in corresponding CN Patent Application No. 201310357997.1, dated Oct. 20, 2015, 28 pages.
Chinese Second Office Action (including English translation) issued in corresponding CN Patent Application No. 201310357997.1, dated May 16, 2016, 18 pages.
Chinese Decision on Rejection issued in corresponding CN Patent Application No. 201310357997.1, dated Sep. 1, 2016, 8 pages.
Chinese Notification of Reexamination issued in corresponding CN Patent Application No. 201310357997.1, dated Jan. 17, 2018, 9 pages.
Chinese Decision of Reexamination issued in corresponding CN Patent Application No. 201310357997.1, dated Jun. 26, 2018, 10 pages.
Chinese Notification to Grant Patent Right's Search Report issued in corresponding CN Patent Application No. 201310357997.1, dated Jul. 20, 2018, 2 pages.
Chinese Notification to Grant Patent (including English translation) issued in corresponding CN Patent Application No. 201310357997.1, dated Aug. 2, 2018, 4 pages.
European Extended Search Opinion and Report issued in corresponding EP Patent Application No. 14836323.7, dated Feb. 2, 2017, 9 pages.
Japanese Office Action (including English translation) issued in corresponding JP Patent Application No. 2016-533800, dated Apr. 11, 2017, 7 pages.
Korean First Office Action (including English translation) issued in corresponding KR Patent Application No. 10-2016-7006997 dated Nov. 14, 2016, 11 pages.
Korean Final Office Action (including English translation) issued in corresponding KR Patent Application No. 10-2016-7006997 dated May 24, 2017, 4 pages.
European Office Action issued in corresponding EP Patent Application No. 14836323.7, dated May 16, 2018, 9 pages.
Hu Juan et al: "CN 10 21 03 578—Method and System for Performing Fine Adjustment on Tables by Using Computer". Official EN Translation provided from EPO, Jun. 22, 2011 (Jun. 22, 2011), XP55473122.
Bier E: "Ph.D. Thesis: Snap-Dragging: Interactive GEometric Design in Two and Three Dimensions", Thesis University of California, May 19, 1988 (May 19, 1988), pp. 1-168, XP001091538.
European Invitation to File Search Report of Previous Application issued in corresponding EP Patent Application No. 14836323.7, dated Sep. 11, 2017, 1 page.

* cited by examiner

METHOD AND APPARATUS FOR ADSORBING STRAIGHT LINE/LINE SEGMENT, METHOD AND APPARATUS FOR CONSTRUCTING POLYGON

CROSS-REFERENCE TO RELATED APPLICATION

This is a U.S. national stage application of PCT Application No. PCT/CN/2014/083862 under 35 U.S.C. 371, filed Aug. 7, 2014 and published in Chinese, which claims the priority benefit of Chinese Application No. 201310357997.1, filed Aug. 16, 2013. The entire contents of these documents are hereby incorporated herein by reference.

BACKGROUND

Technical Field

The present invention relates to an image recognition technology, and in particular, to a method for adsorbing a straight line/line segment in an image. The present invention further relates to an image recognition apparatus, and in particular, to an apparatus for adsorbing a straight line/line segment in an image. The present invention also relates to an image processing method, and in particular, to a method for constructing a polygon in an image. The present invention also relates to an image processing apparatus, and in particular, to an apparatus for constructing a polygon in an image.

Related Art

At present, an increasing quantity of functions of processing and retrieving information of a shot picture start emerging on a business device such as a scanner and a business phone. These functions may generally be categorized into two types:

1) Correction and Enhancement of a Whiteboard Image

A whiteboard image is an image obtained by shooting a conference whiteboard, a billboard and other text-type rectangular targets. Information in which a user is interested in a whiteboard image is generally in a rectangular area. In a picture obtained through shooting, first there is an unwanted edge area outside a target rectangular area, and next because of a problem of a shooting angle, a case of an irregular quadrilateral (as shown in FIG. 1) or a missing corner (as shown in FIG. 2) may occur in the target rectangular area. An image is processed to remove parts outside a target area and transform an irregular quadrilateral into a regular rectangle (as shown in FIG. 3), or to fill a missing corner part (as shown in FIG. 4); a color image is converted into a black-and-white image, and an image enhancement operation is performed to make text clearer.

2) Recognition of Text in a Text Image

A text image is an image obtained by shooting a standard text, for example, an A4-format paper text, a page in various books, and a movie poster. In text recognition, data of a text image is processed by using a text recognition engine to recognize text in the image. Text content in a text image is generally displayed in a rectangular area. In a picture obtained through shooting, there is an unwanted edge area outside a target rectangular area, and next, because of a problem of a shooting angle, a case of an irregular quadrilateral (as shown in FIG. 1) or a missing corner (as shown in FIG. 2) may occur in the target rectangular area. To enable a text recognition engine to recognize a text image more accurately and rapidly, the image needs to be processed to remove parts outside a target area and transform an irregular quadrilateral into a regular rectangle (as shown in FIG. 3), or to fill a missing corner part (as shown in FIG. 4); and a color text image is converted into a black-and-white image, and an image enhancement operation is performed to make a contrast between text and the background in the image clearer.

In both types of operations above, a quadrilateral frame detection operation needs to be performed. The quadrilateral frame detection operation refers to that detection is performed on a shot image to retrieve a target quadrilateral frame, so that in a subsequent operation, an area outside the quadrilateral frame is removed and an operation of rectangular frame correction or corner filling is performed on the quadrilateral frame. However, in an actual operation, a range of a quadrilateral frame obtained through automatic detection may be not an expected result. As shown in FIG. 5, the part of the dotted-line range is supposed to be a target frame, but the part of the solid-line range is actually detected; or as shown in FIG. 6, in a source image, there are multiple frames that can be used for capturing. The part of the dotted-line range on the left side is supposed to be a target frame, but instead the part of the solid-line range on the right side is actually detected. Therefore, during initial detection of an image, one interaction interface needs to be provided to a user to adjust a target frame.

In the disclosed text of Chinese Invention Patent Publication No. CN101807293A, a method for constructing a quadrilateral frame by using vertex adsorption is recorded. However, in an actual operation, because a shooting background is relatively messy, it may be difficult to recognize a position of a vertex, or a vertex of a quadrilateral to be recognized is a rounded corner. These all result in that a vertex adsorption function becomes unusable, and a user cannot construct a quadrilateral frame by using a vertex.

SUMMARY

A technical problem to be resolved by the present invention is to provide a method for adsorbing a straight line/line segment in an image, and a device for adsorbing a straight line/line segment by using this method, and a method for constructing a polygon in an image, and a device for constructing a polygon by using this method, so that a position of a quadrilateral frame in an image can be conveniently recognized, so as to construct a quadrilateral for use in subsequent image processing.

To resolve the foregoing technical problem, a technical solution of a method for adsorbing a straight line/line segment in an image of the present invention includes: presetting a straight line/line segment, dragging the straight line/line segment by selecting a first part of the straight line/line segment, and when a second part of the straight line/line segment is in the vicinity of a line segment in an image, setting the preset straight line/line segment to be superposed with the line segment, the vicinity referring to that a minimum distance between the second part of the straight line/line segment and the line segment meets a preset rule.

Another technical solution of a method for adsorbing a straight line/line segment in an image of the present invention includes: presetting a straight line/line segment, dragging the straight line/line segment by selecting a first part of the straight line/line segment, and if when dragging ends, a second part of the straight line/line segment is in the vicinity of a corresponding second part of a line segment in an image, setting the preset straight line/line segment to be superposed with the line segment, the vicinity referring to that a minimum distance between the second part of the straight line/line segment and the corresponding second part of the line segment meets a preset rule.

The present invention further discloses an apparatus for adsorbing a straight line/line segment in an image. A technical solution of the apparatus for adsorbing a straight line/line segment in an image is based on a mobile communication data terminal platform and adopts the foregoing method for adsorbing a straight line/line segment in an image.

The present invention also discloses a method for constructing a polygon in an image. In a technical solution of the method for constructing a polygon in an image, one polygon frame enclosed by multiple straight lines/line segments is preset; and a position of a straight line/line segment of at least one side of the polygon frame is determined by using the foregoing method for adsorbing a straight line/line segment in an image, so as to construct, in an image, one polygon enclosed by multiple straight lines/line segments.

The present invention further discloses an apparatus for constructing a polygon in an image. A technical solution of the apparatus for constructing a polygon in an image is based on a mobile communication data terminal platform and adopts the foregoing method for constructing a polygon in an image.

In the present invention, by means of the foregoing technical solutions, a user can be conveniently assisted, according to a line segment that exists in an image, to define a polygon frame, so that subsequent image processing can be conveniently performed.

BRIEF DESCRIPTION OF THE DRAWINGS

The present invention is further described in detail below with reference to the accompanying drawings and embodiments.

DETAILED DESCRIPTION

The present invention discloses a method for adsorbing a line segment in an image, including: presetting a straight line/line segment, dragging the straight line/line segment by selecting a first part of the straight line/line segment, and when a second part of the straight line/line segment is in the vicinity of a line segment in an image, setting the preset straight line/line segment to be superposed with the line segment, the vicinity referring to that a minimum distance between the second part of the straight line/line segment and the line segment meets a preset rule. In this embodiment, in a process of dragging a preset straight line/line segment, once a second part of the straight line/line segment is dragged to the vicinity of a line segment in an image, the preset line segment is adsorbed to the line segment, that is, is superposed with the line segment.

In another disclosed embodiment of the present invention, a method for adsorbing a line segment in an image, including: presetting a straight line/line segment, dragging the straight line/line segment by selecting a first part of the straight line/line segment, and if when dragging ends, a second part of the straight line/line segment is in the vicinity of a corresponding second part of a line segment in an image, setting the preset straight line/line segment to be superposed with the line segment, the vicinity referring to that a minimum distance between the second part of the straight line/line segment and the corresponding second part of the line segment meets a preset rule. In this embodiment, when a process of dragging a preset straight line/line segment ends, for example, on a smart phone using a touch screen, when a user drags a preset straight line/line segment and then the finger leaves the touch screen, if a second part of the straight line/line segment is in the vicinity of a corresponding second part of a line segment in an image, the preset straight line/line segment is adsorbed to the line segment, that is, is superposed with the line segment.

Figure 1:
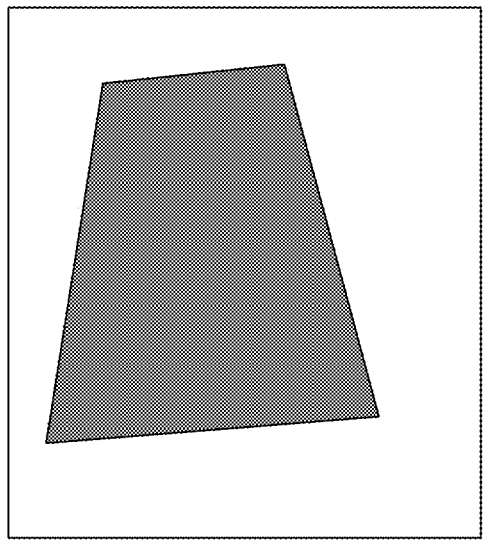
FIG. 1 to FIG. 4 are schematic diagrams of an image after shooting and processing of a whiteboard and a text.
Figure 2:
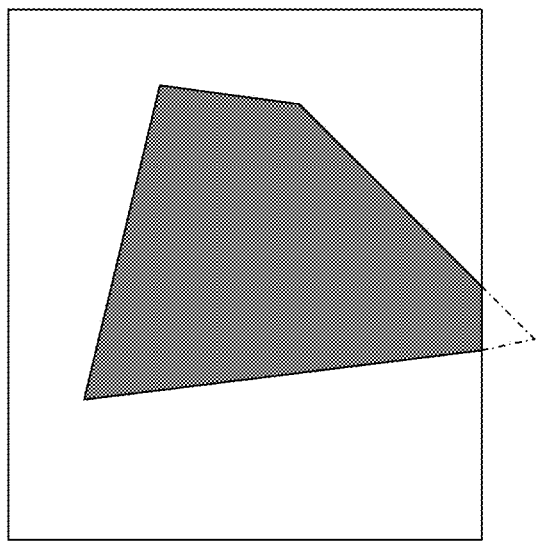
Figure 3:
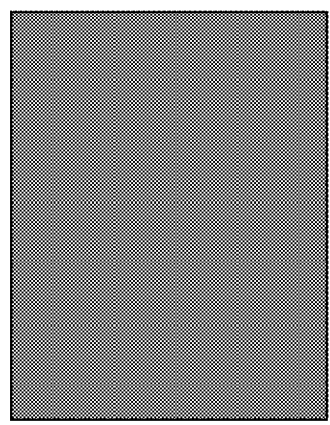
Figure 4:
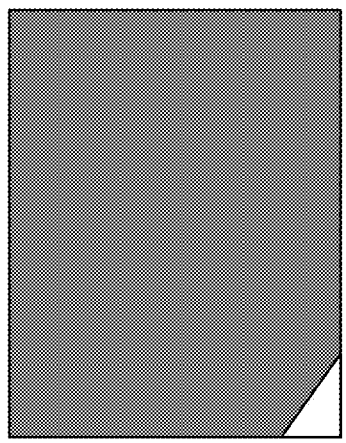
Figure 5:
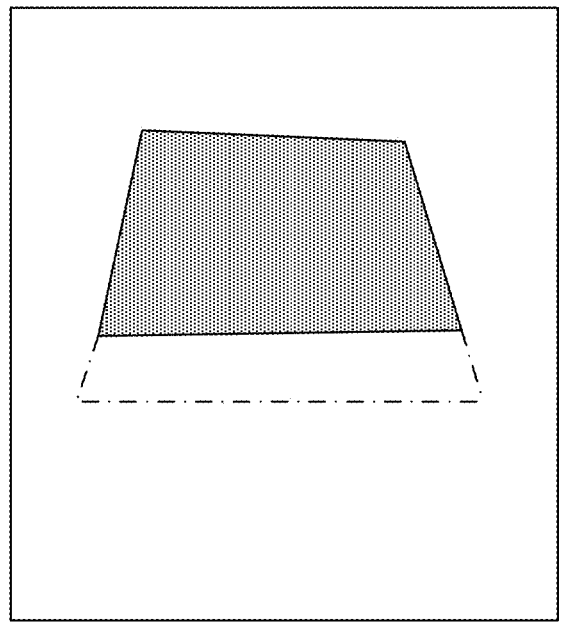
FIG. 5 and FIG. 6 are schematic diagrams that a target frame after frame capturing needs to be further adjusted.
Figure 6:
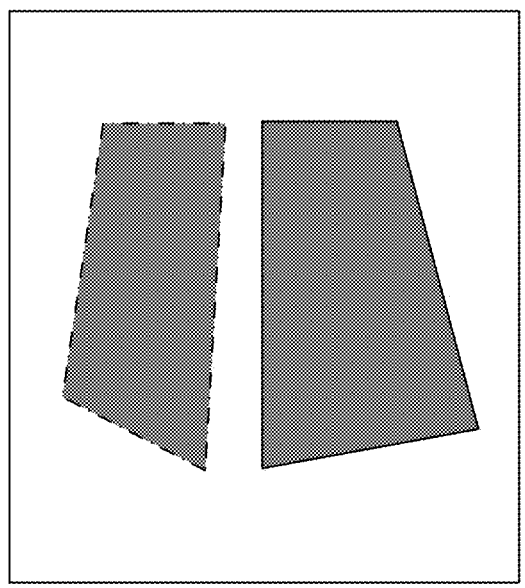
Figure 7:
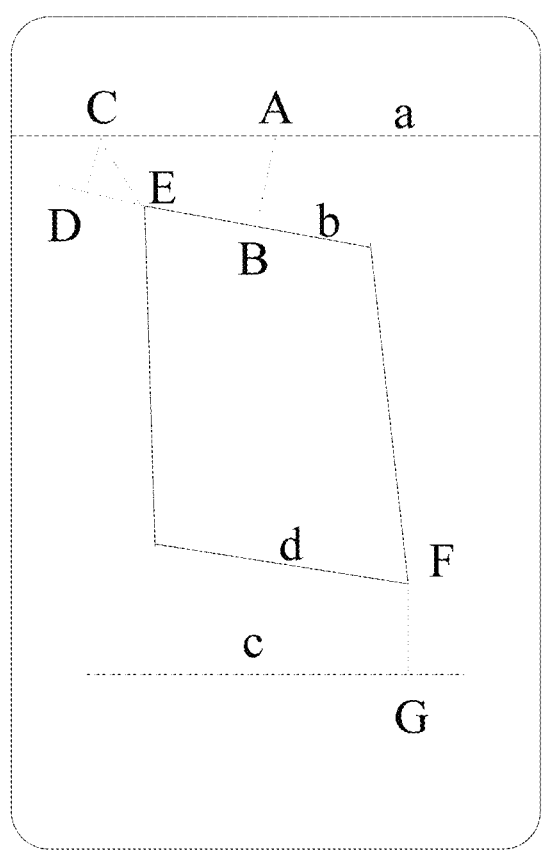
FIG. 7 is a schematic diagram of a method for adsorbing a line segment in an image according to the present invention.
Figure 8:
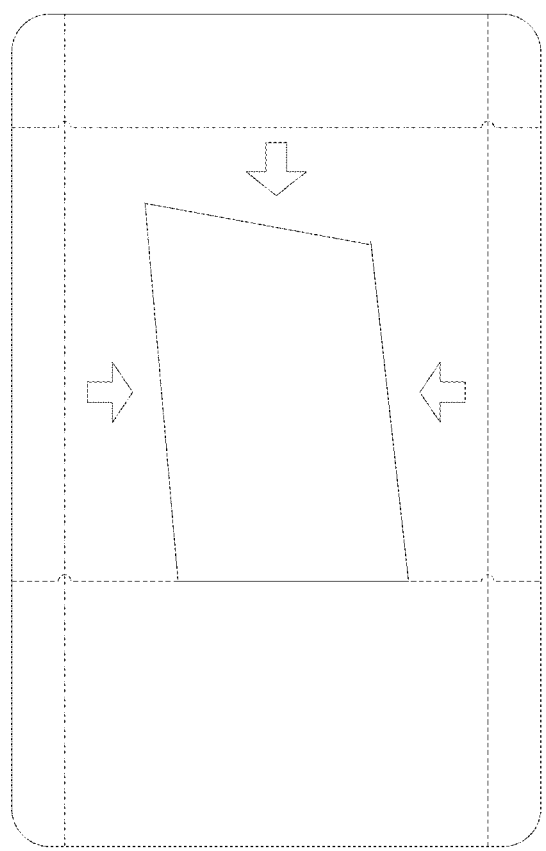
FIG. 8 to FIG. 11 are schematic diagrams of a method for constructing a polygon in an image according to the present invention.
Figure 9:
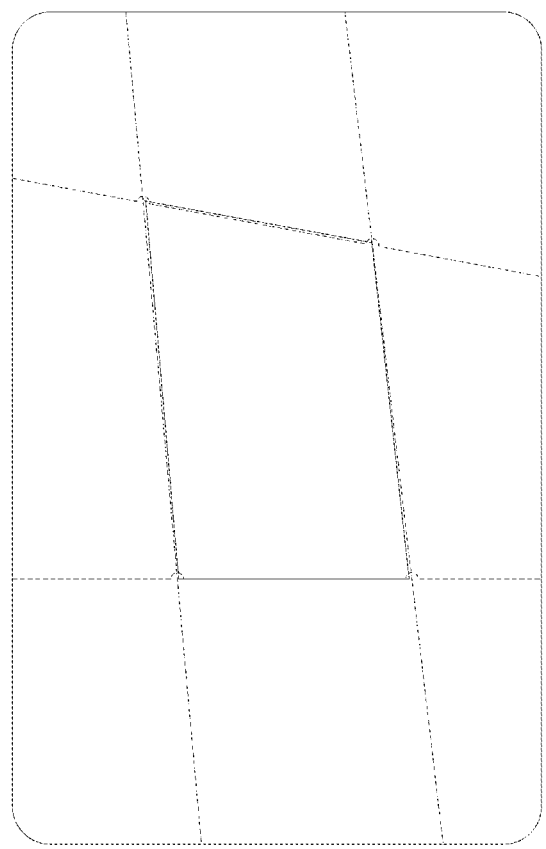
Figure 10:
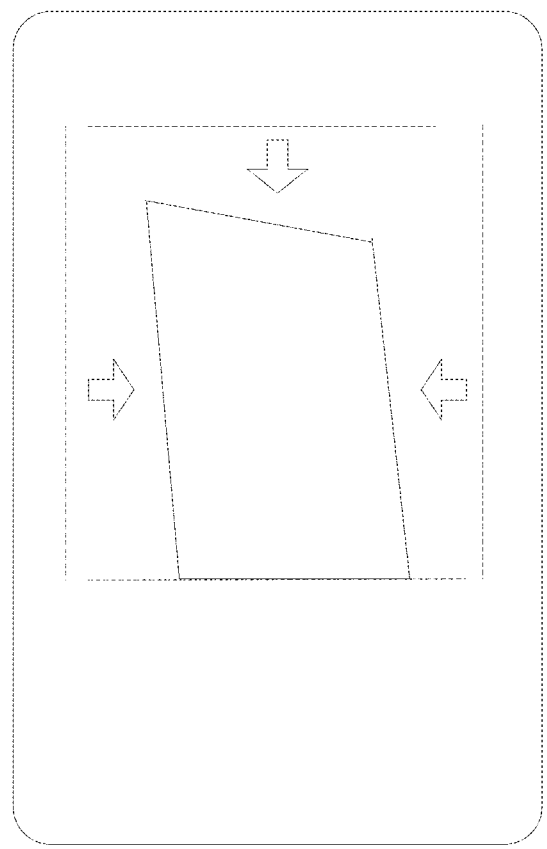
Figure 11:
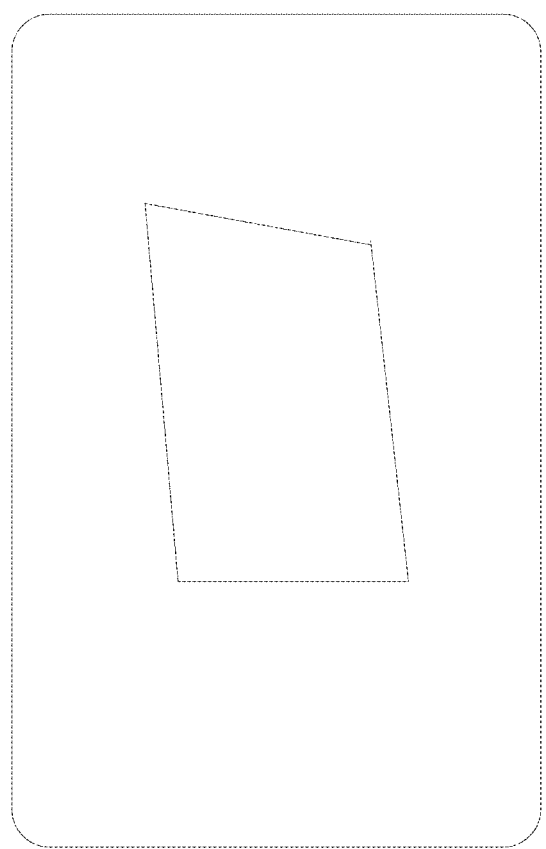

In the foregoing embodiment, the minimum distance between the preset line segment and the line segment may be understood as follows: As shown in FIG. 7, a vertical line is made from a second part A or C of the preset straight line a to a line segment b or an extended line of the line segment b, and a length of a vertical line segment AB or CD may be regarded as the minimum distance; or, if a vertical intersection D of the vertical line CD is on the extended line of the line segment b, a distance CE between the second part C and an endpoint E, near the vertical intersection, on the line segment b may also be regarded as the minimum distance.

In the present invention, a straight line, for example, the straight line a shown in FIG. 7, may be preset; or a line segment, for example, a line segment c shown in FIG. 7, may be preset.

A method for detecting a line segment in an image is a relatively mature technology at present. There may be specifically multiple methods. For example, all line segments in an image may be obtained through Hough transform, and details are no longer described in the present invention.

A line segment in the image in the present invention may be a straight line segment, or may be a curved-line segment that approximates to a straight line segment. In some images, especially in a photo image, for a reason such as a distortion in a shooting lens or uneven edges of a shot object, in a shot photo, a part that is supposed to be a straight line segment may bend or undulate. In the present invention, a curved-line segment that does not bend and undulate very severely may also be recognized as a straight line segment. A specific recognition manner is also very mature in the prior art.

On a smart phone using a touch screen, a position where a user taps may be not very precise, and therefore the first part selected in dragging the preset straight line/line segment may be on the preset line segment, or may be in the vicinity of the preset line segment.

The first part selected in dragging the preset line segment and the second part on the line segment are a same part or different parts. If the first par and the second part are a same part, it becomes convenient for a user to drag further directly the preset line segment to a desired position of dragging. However, if content in an image is relatively complex, the first part and the second part may be different parts. In this case, during dragging of the user, a finger of the user does not block the second part, so that it is convenient for the user to determine the position of the preset line segment in a process of dragging.

The second part may be an endpoint of the preset line segment, or may be a midpoint of the preset line segment, or similarly, may be another position on the preset straight line/line segment, which may be set during use, or is a point, having a minimum distance from any position on a line segment in the image, on the preset straight line/line segment. As shown in FIG. 7, the preset line segment c has a minimum distance from a point F on a line segment d in the image; therefore, a vertical line FG is made from the point F to the preset line segment c, and a vertical point G is a point, having a minimum distance from any position on the line segment d, on the line segment c. For the selection of a second part, a position, intersecting with another line segment, on a line segment may be avoided, so that adsorption becomes more accurate. These second parts may be marked by using special marks, and therefore become noticeable to a user.

The preset rule may be that a distance is less than a preset value.

The preset rule may also be that a distance meets a preset formula. For example, a value is obtained by multiplying a length of a line segment in an image by one proportional factor. When a distance is less than the value, a preset line segment is adsorbed to the line segment, that is, is superposed with the line segment. There are also many similar rules, a person skilled in the art may set the rule flexibly, and details are no longer described herein.

The present invention further discloses an apparatus for adsorbing a line segment in an image, based on a mobile communication data terminal platform, and adopting the foregoing method for adsorbing a straight line/line segment in an image.

The present invention also discloses a method for constructing a polygon in an image, where one polygon frame enclosed by multiple straight lines/line segments is preset; and a position of a straight line/line segment of at least one side of the polygon frame is determined by using the foregoing method for adsorbing a straight line/line segment in an image, so as to construct, in an image, one polygon enclosed by multiple straight lines/line segments, as shown in FIG. 8 to FIG. 11.

In an actual application, a most common case is that the polygon is a quadrilateral, so that it may be convenient for a user to perform various types of image processing.

In one preferred embodiment, one polygon is first preset on an image, and a length and a position of a line segment of at least one side of the polygon frame are then determined by using the foregoing method for adsorbing a straight line/line segment in an image, so as to construct one polygon in the image.

Furthermore, at least one side of the preset polygon is set to be a line segment in the image.

When a straight line/line segment of a frame is being dragged, vertices, other than two endpoints of the frame, of the polygon are kept unchanged. In this way, a user may adjust as few side lines as possible, and then obtain a needed quadrilateral frame. A quadrilateral is used as an example, and generally, the user only needs to adjust two opposite sides to obtain one quadrilateral frame.

When a preset line segment is used to construct a polygon, if two adjacent sides still do not have an intersection after a position of the preset line segment is determined by using the foregoing method for adsorbing a straight line/line segment in an image, the two adjacent sides are extended and intersect in a direction in which the two adjacent sides can intersect, and the intersection and the extended two adjacent sides are all used as components of the constructed polygon. For a polygon in an image, if a vertex of the polygon is not a corner where straight lines intersect and is a rounded angle instead, or a position of a vertex of the quadrilateral cannot be clearly recognized in the image for other reasons, a position of the vertex can be effectively found by using the foregoing method, so as to construct a polygon.

The present invention further discloses an apparatus for constructing a polygon in an image, based on a mobile communication data terminal platform, and adopting the foregoing method for constructing a polygon in an image.

In the prior art, to recognize a polygon in an image, a user needs to determine endpoints of each side line, and therefore each side line needs to be set at least twice. In the present invention, by means of the foregoing technical solutions, according to a line segment that exists in an image, determining of a position of a line segment can be completed with one time of setting, so as to conveniently assist the user to define a polygon frame, so that subsequent image processing can be conveniently performed.

Only preferred examples of the present invention are provided above, and are not used to limit the essential technical content and scope of the present invention. The essential technical content of the present invention is defined in the claims in a general sense. Any technical entity or method completed by others that is identical with what is claimed in the claims or is an equivalent variation shall be construed as falling within the scope of the claims.

What is claimed is:

1. A method for performing a frame detection operation in an image for image recognition, comprising:
    providing, by a device comprising a processor and a screen, the image on which the frame detection operation is to be performed;
    detecting, by the device, a line segment in the image;
    displaying, by the device, a target frame enclosed by preset straight line/line segment of the image on the screen;
    dragging, by the device, the straight line/line segment when detecting that a user performs a dragging operation on the screen to further define the target frame, the dragging operation indicating a first part of the straight line/line segment is selected and moved, and
    when a second part of the straight line/line segment is within a preset distance from the detected line segment in the image, superposing the preset straight line/line segment with the detected line segment on the screen to finalize the target frame for image recognition on the target frame.

2. The method according to claim 1, wherein the first part selected in dragging the preset line segment is either on the preset straight line/line segment or in the vicinity of the preset straight line/line segment.

3. The method according to claim 1, wherein the first part selected in dragging the preset straight line/line segment and the second part on the straight line/line segment are a same part or different parts.

4. The method according to claim 1, wherein the second part comprises at least one of the following cases:
    an endpoint of the preset line segment;
    a midpoint of the preset line segment; and
    a point, having a minimum distance from any position on the detected line segment in the image, on the preset straight line/line segment.

5. A method for performing a frame detection operation in an image, comprising:
    providing, by a device comprising a processor and a screen, the image on which the frame detection operation is to be performed;

detecting, by the device, a line segment in the image;

displaying, by the device, a target frame enclosed by preset straight line/line segment of the image on the screen;

dragging, by the device, the straight line/line segment by selecting a first part of the straight line/line segment when detecting that a user performs a dragging operation on the screen to further define the target frame, the dragging operation indicating the first part of the straight line/line segment, and when dragging ends, a second part of the straight line/line segment is within a preset distance from a corresponding second part of the detected line segment in the image, superposing the preset straight line/line segment with the detected line segment on the screen to finalize the target frame for image recognition on the target frame.

6. The method according to claim 5, wherein the first part selected in dragging the preset line segment is either on the preset straight line/line segment or in the vicinity of the preset straight line/line segment.

7. The method according to claim 5, wherein the first part selected in dragging the preset straight line/line segment and the second part on the straight line/line segment are a same part or different parts.

8. The method according to claim 5, wherein the second part is a point, having a minimum distance from any position on the detected line segment in the image, on the preset straight line/line segment.

9. An apparatus for performing a frame detection operation in an image, comprising:

a processor and a screen, wherein the processor is configured to provide the image on which the frame detection operation is to be performed;

detect a line segment in the image;

instruct the screen to display a target frame enclosed by preset straight line/line segment of the image on the screen;

drag the straight line/line segment when detecting that a user performs a dragging operation on the screen to further define the target frame, the dragging operation indicating a first part of the straight line/line segment is selected and moved, and when a second part of the straight line/line segment is within a preset distance from the detected line segment in the image, superpose the preset straight line/line segment with the detected line segment on the screen to finalize the target frame for image recognition on the target frame.

10. The apparatus according to claim 9, wherein the first part selected in dragging the preset line segment is either on the preset straight line/line segment or in the vicinity of the preset straight line/line segment.

11. The apparatus according to claim 9, wherein the first part selected in dragging the preset straight line/line segment and the second part on the straight line/line segment are a same part or different parts.

12. The apparatus according to claim 9, wherein the second part comprises at least one of the following cases:

an endpoint of the preset line segment;

a midpoint of the preset line segment; and a point, having a minimum distance from any position on the detected line segment in the image, on the preset straight line/line segment.

13. The method according to claim 1, further comprising:

obtaining a value by multiplying a length of the detected line segment in the image by a proportional factor, when the distance is less than the value, superposing the preset straight line/line segment with the detected line segment on the screen to construct a polygon so that a position of a quadrilateral frame in the target frame is conveniently recognized.

* * * * *